US006406796B1

(12) United States Patent
Ohmura et al.

(10) Patent No.: US 6,406,796 B1

(45) Date of Patent: Jun. 18, 2002

(54) SUBSTRATES FOR CAST-COATED PAPER AND CAST-COATED PAPER USING THE SAME

(75) Inventors: Tomonobu Ohmura; Takashi Ueno, both of Tokyo (JP)

(73) Assignee: Nippon Paper Industries, Co., Ltd., Tokyo (JP)

( * ) Notice: Subject to any disclaimer, the term of this patent is extended or adjusted under 35 U.S.C. 154(b) by 0 days.

(21) Appl. No.: 09/144,622

(22) Filed: Aug. 31, 1998

(30) Foreign Application Priority Data

Sep. 5, 1997 (JP) ............................................ 9-257777

(51) Int. Cl.[7] ............................ B32B 23/08; B32B 5/16

(52) U.S. Cl. ....................................... 428/511; 428/328

(58) Field of Search ................................ 428/511, 328, 428/558, 560; 252/74, 76

(56) References Cited

U.S. PATENT DOCUMENTS

| | | | | | |
|---|---|---|---|---|---|
| 3,982,056 | A | * | 9/1976 | Holder, Jr. | 427/36.1 |
| 3,996,179 | A | * | 12/1976 | Haus et al. | 260/29.6 R |
| 4,265,969 | A | * | 5/1981 | Yasuda et al. | 428/342 |
| 4,301,210 | A | * | 11/1981 | Yasuda et al. | 428/342 |
| 4,464,505 | A | * | 8/1984 | Kawakami et al. | 524/512 |
| 4,495,226 | A | * | 1/1985 | Smith | 427/326 |
| 4,837,200 | A | | 6/1989 | Kondo et al. | 428/195 |
| 5,270,355 | A | * | 12/1993 | Kawano et al. | 523/404 |
| 5,275,846 | A | * | 1/1994 | Imai | 427/362 |
| 5,318,943 | A | * | 6/1994 | Ueno et al. | 503/227 |
| 5,320,897 | A | | 6/1994 | Kondo et al. | 428/195 |
| 5,354,800 | A | * | 10/1994 | Suzuki et al. | 524/460 |
| 5,425,998 | A | * | 6/1995 | Minakawa et al. | 428/494 |
| 5,470,918 | A | * | 11/1995 | Tsutumi et al. | 525/329.2 |
| 5,662,995 | A | * | 9/1997 | Sakurai et al. | 428/304.4 |
| 5,750,200 | A | * | 5/1998 | Ogawa et al. | 427/361 |
| 5,851,651 | A | * | 12/1998 | Chao | 428/327 |
| 5,885,720 | A | * | 3/1999 | Fujiwara et al. | 428/511 |
| 5,919,958 | A | * | 7/1999 | Chao | 428/327 |
| 5,958,168 | A | * | 9/1999 | Liu et al. | 156/230 |
| 5,985,424 | A | * | 11/1999 | DeMatte et al. | 428/212 |
| 5,989,378 | A | * | 11/1999 | Liu et al. | 156/241 |
| 6,156,606 | A1 | * | 1/2001 | Kasahara et al. | 428/322.3 |
| 6,180,219 | B1 | * | 1/2001 | Hoshino et al. | 428/312.2 |

FOREIGN PATENT DOCUMENTS

| | | |
|---|---|---|
| EP | 0 423 829 | 4/1991 |

* cited by examiner

*Primary Examiner*—Blaine Copenheaver
*Assistant Examiner*—Kevin R Kruer
(74) *Attorney, Agent, or Firm*—Millen, White, Zelano & Branigan, P.C.

(57) ABSTRACT

A substrate used for cast-coated paper, with the substrate having Cobb water absorbency of from 30 to 100 g/m$^2$ and Oken smoothness of at least 30 seconds on the side where the cast-coated layer is to be provided, and a cast-coated paper which is produced using such a substrate to acquire ink jet recording suitability and improved productivity.

11 Claims, No Drawings

SUBSTRATES FOR CAST-COATED PAPER AND CAST-COATED PAPER USING THE SAME

FIELD OF THE INVENTION

The present invention relates to a cast-coated paper and, more particularly, to a substrate that enables easy and speed production of a cast-coated paper having excellent ink jet recording characteristics, and to a cast-coating paper produced using such a substrate.

BACKGROUND OF THE INVENTION

In an ink jet recording system, ink droplets jetted out in a variety of ways form images on a recording paper, and such a recording system has features that it makes less noise than a dot-impact recording system and enables high-speed recording as well as easy full color recording. Therefore, amazing progress of ink jet printers has been made in recent years, and even printers of a moderate price have come to provide sufficiently vivid recorded images; as a result, ink jet printers are now widespread.

The following characteristics are basically required for an ink jet recording paper:

i) Having a high ink absorbing capacity enough not to cause repelling, feathering and overflow of ink, ii) Having good ink-drying properties (high ink-absorbing speed), and iii) Generating no cockling upon absorption and drying of ink.

Further, with the recent progress of ink jet printers, the images recorded therewith are similar in quality level to images of silver halide photographs, and so it is required for the recording medium to have high gloss on the recording side.

With the intention of conferring high gloss on the recording side of a recording medium, it has been attempted to use as a substrate a plastic film or synthetic paper having no water-absorbing properties. In this case, the coated layer is required to absorb all of the ink printed because the substrate has no ink absorbing power. However, the use of such a substrate has a drawback of decreasing the ink-absorbing speed since the ink absorbing capacity of the coated layer alone is generally insufficient.

On the other hand, cast-coated papers have so far been applied to printing papers and various wrapping materials, and they are characterized by high gloss of the coated layer surface. Hitherto, the so-called base paper, including paper of non-coated type and paper of coated type, has been used as the substrate of cast-coated paper. These substrates have features such that they have high surface smoothness so that their texture has no influence upon the glossy surface and they are highly sized so as to inhibit a coating solution from permeating thereinto. In order to promote these features, the substrate of coated paper type is provided with a special coating.

A cast-coated paper is generally produced by applying a coating solution to a substrate as mentioned above and pressing the coated layer to a hot finishing surface while the coated layer is in a wet or plasticized state to copy the finishing surface on the coated layer surface simultaneously with the drying of the coated layer. The finishing surface is generally a specular metal surface, so that the coated layer surface has high gloss by copying the specular metal surface thereon.

Thus, the cast-coating method is an effective means for conferring high gloss on the coated layer, and already applied to ink jet recording papers (as disclosed, e.g., in Japanese Tokkai Sho 62-95285 and ibid. Sho 63-264391, wherein the term "Tokkai" as used herein means "unexamined published patent application").

In the cast coating method, however, a coated paper requires to be dried while the wet coating is pressed to the specular surface of metal. Consequently, the water contained in the coated layer should pass through a substrate and evaporate on the back side of the coated paper. In the case where a general coated paper is produced, on the other hand, water is evaporated on the front side or both sides of the coated layer. Therefore, drying efficiency in the cast coating method is far lower than that in the production of a general coated paper; as a result, the operation speed of a coater is low. Consequently, the productivity of cast-coated paper becomes low.

Further, the cast coating method has a problem of being inferior in continuous operability.

More specifically, in the production of a cast-coated paper, the releasability of the coated layer from the finishing surface is impaired when the drying of the coated layer is insufficient, and thereby the coated layer is partially or entirely picked off by the finishing surface, namely the so-called "drum pick" is caused. As a result, the quality of cast-coated paper is extremely damaged. Further, the drum pick sometimes induces the problem that the paper web is broken in a short time. In addition, the paper web break renders the coater dirty in most cases. Consequently, the operation is interrupted for a long period of time for cleaning the coater surface. Such being the case, the productivity is lowered the higher the frequency of paper break becomes.

On the other hand, when the surface temperature of the finishing surface is raised in order to increase the drying speed, the coated layer pressed against the finishing surface is heated rapidly to be liable to boil. If the coated layer boils, it cannot be in close contact with the finishing surface; as a result, it cannot copy the finishing surface to a satisfactory extent, and so the surface quality thereof is considerably lowered. Thus, there is a limit to the increase of a coater speed by making the drying condition hard. Accordingly, the productivity of cast-coated paper is inferior to that of general coated paper.

Further, in order to cover the texture of a substrate and acquire high gloss, it is necessary for a conventionally used substrate of non-coated paper type to be provided with a coated layer having a dry coverage rate of 15 to 30 g/m$^2$ per side, so that the resulting paper falls under the category of heavily coated paper.

In some cases where substrates of coated paper type are used, on the other hand, sufficiently high gloss can be achieved even when the dry coverage rate per side is of the order of 10 g/m$^2$. Therein, however, the coated layer itself is not sufficient in ink absorbing capacity, and the substrate has almost no ink absorbing power. Therefore, the paper obtained in such cases is unsuitable for ink jet recording paper.

As described above, it is required for the ink jet recording paper to secure sufficient ink absorbing capacity. In addition, the cockling phenomenon caused in a recording paper upon absorption and drying of ink can be minimized so far as all the ink stricken in can be accepted by the coated layer. In this aspect also, it is necessary to increase the dry coverage rate of the coated layer.

In a case where the cast-coated layer alone answers for security of the ink absorbing capacity required, it is necessary to increase the dry coverage rate of the coated layer. In this case, however, the drying efficiency is lowered all the more, so that the coater operation speed in the cast coating method is, as described above, considerably decreased in comparison with general coating methods. With respect to the ink absorbing speed, on the other hand, the cast-coated paper for ink jet recording has a low ink absorbing speed due to smoothness on the recording side, compared with general coated paper for ink jet recording. In making up for this defect, it is generally required to deal with this subject along the line of increasing the dry coverage rate.

Furthermore, another reason for the low productivity is in that the coating compositions for ink jet recording paper are low in solids concentration, compared with those for general coated paper. This is because silica and other porous pigments used for securing ink jet recording suitability are poor in dispersibility, and the dispersions thereof have high viscosity and they are inferior in operational easiness; as a result, it is impossible to adequately heighten the solids concentration.

Thus, the productivity of cast-coated paper for ink jet recording is extremely low since it undergoes both influences of the low productivity of a cast coating method and the low productivity of a coating solution for ink jet recording.

In recent years, certain kinds of metal oxide sol having an average particle size of the order of 20–100 nm have frequently been used in ink jet recording paper. Those pigments can ensure high density in the recorded images, enable ink dots to have high circularity coefficient and so on, so that they have characteristics appropriate for forming high definition recorded images. However, they are very expensive. In addition, they are inferior in ink absorbing power to prevailingly used pigments such as silica, so it is required for them to have an increased dry coverage rate.

The production of cast-coated paper for ink jet recording by the use of the foregoing expensive material entails very high cost, because the material cost (variable part of cost) is added to the low productivity (fixed part of cost) as mentioned above.

In the case of producing an ink jet recording paper having high gloss on the recording side in accordance with a cast coating method, the characteristics, especially ink absorption, and the productivity are in a trade-off relation.

SUMMARY OF THE INVENTION

Therefore, a first object of the present invention is to provide a substrate used in a cast-coated paper for ink jet recording which can improve the productivity of the cast-coated paper and ensure excellent ink absorbency in the cast-coated paper.

A second object of the present invention is to provide a cast-coated paper for ink jet recording which has not only excellent ink absorbency but also high productivity.

The aforesaid objects of the present invention are attained by a substrate having water absorbency of from 30 to 100 g/m$^2$, determined using the Cobb testing method described in JIS P8140 (corresponding to JAPAN TAPPI T441 and ISO 535) under a condition that water absorption time is 60 seconds, and smoothness of at least 30 seconds, measured with an Oken type smoothness tester according to the procedure described in JAPAN TAPPI No.5, on the side where a cast-coated layer is to be provided; and by a cast-coated paper using such a substrate.

DETAILED DESCRIPTION OF THE INVENTION

The cast coating method adopted in the present invention is characterized in that the coated layer on a substrate is pressed against a hot finishing surface of metallic cast drum while all or the surface part thereof is in a wet or plasticized state to dry the coated layer and copy the finishing surface on the coated layer at the same time.

Additionally, although the cast coating method is classified into three processes, a direct process, a re-wet process and a coagulating process, all the processes may be applicable to the present invention.

It is common to these processes that the surface of a coated layer acquires high gloss by copying the cast drum surface thereon, but they differ in steps that the coating solution applied to a substrate undergoes before it is pressed against a cast drum. Specifically, the following are their respective features:

In a direct process, the cast coating solution applied to a substrate is pressed against a cast drum in a state that it undergoes no drying operation at all.

In a re-wet process, the cast coating solution applied to a substrate is once dried or semi-dried, and then treated with a re-wetting solution to recover a plasticized state, and thereafter pressed against a cast drum.

In a coagulating process, the cast coating solution applied to a substrate is treated with a coagulating solution to be converted into a gel state having no fluidity, and then pressed against a cast drum.

Additionally, the term “cast drum” as used herein refers to as “a metallic drum having a specular cylindrical external surface”.

The present substrate for cast coating is a coated paper that is produced by providing a coated layer comprising a pigment, a binder and other additives on at least one side of non-coated paper comprising wood pulp and a filler, and has water absorbency of from 30 to 100 g/m$^2$, determined by the Cobb testing method according to JIS P8140 (which refers to as Cobb water absorbency hereinafter), and smoothness of at least 30 seconds, measured with an Oken type smoothness tester following the operational procedure described in JAPAN TAPPI No. 5 (which refers to as smoothness hereinafter), on the side where the coated layer is provided (or on the side where a cast-coated layer is to be provided). Preferably, the Cobb water absorbency of the present substrate on the coated layer side is from 40 to 80 g/m$^2$ and the Oken smoothness of the coated layer is at least 50 seconds.

When the cast-coated paper produced by providing a cast-coated layer on a substrate having Cobb water absorbency less than the foregoing range is used for ink jet recording, the ink overflows thereon due to poor ink absorbency of the substrate and the feathering of ink is caused in the color-mixed area because the ink absorption is slow. While it is possible to increase a dry coverage rate of the cast-coated layer with the intention of dealing with these defects, increasing the dry coverage rate lowers the productivity. Therefore, this measure does not meet the objects of the present invention.

When the cast-coated layer is provided on a substrate having Cobb water absorbency more than the foregoing range, the binder component alone permeates into the substrate; as a result, it becomes difficult to ensure high gloss in the surface thereof. In other words, such a substrate lets the cast-coated layer lose its particular feature. Although the increased dry coverage rate of a cast-coated layer can meet this case also, it causes the lowering of productivity. Thus, this measure is inadequate for the present purposes.

Further, the smoothness of a substrate has a great influence upon the smoothness or the glossiness of a cast-coated layer provided on the substrate. More specifically, if the substrate used has higher smoothness, the cast-coated layer provided thereon can have the better surface even when the dry coverage rate thereof is low.

Accordingly, in order that a cast-coated paper according to the present invention has the productivity significantly heightened by a substantial reduction in dry coverage rate of a cast-coated layer without lowering the glossiness of the resulting cast-coated paper on the recording side and deteriorating the quality of images formed thereon by ink jet recording, compared with hitherto proposed and practically used cast-coated papers for ink jet recording, it is required, as mentioned above, to employ a substrate having Cobb water absorbency of from 30 to 100 g/m$^2$, preferably from 40 to 80 g/m$^2$, and Oken smoothness of at least 30 seconds, preferably at least 40 seconds, on the cast-coated layer side.

Examples of wood pulp usable in making non-coated paper, which is used as a base of the present substrate for cast coating, include known chemical pulp, mechanical pulp and deinked pulp. In the present invention, only one kind of pulp may be properly selected from those kinds of pulp, or two or more kinds of pulp may be used in various mixing ratios.

Examples of a filler usable in the substrate include calcium carbonate, barium sulfate, magnesium carbonate, kaolin, talc, clay, aluminum hydroxide, silica, alumina, titanium dioxide, zinc oxide, soda ash, and various kinds of plastic fillers. In the present invention, only one filler properly selected from the above-recited ones may be used, or two or more of the fillers as recited above may be used in various mixing ratios.

In mixing the wood pulp and the filler as recited above, the ratio between them has no particular limits, but it can be changed depending on the properties of a coating solution applied and the intended use of a cast-coated paper produced. Generally, the filler is added in an amount of 4 to 40 parts by weight per 100 parts by weight of wood pulp. In addition to the wood pulp and the filler, the paper stock used in the present invention may contain a sizing agent, a wet paper strength increasing agent, a yield improver, a pH modifier, dyes and other additives, if desired. Further, the paper stock may contain a cationic polyelectrolyte, especially when the cast-coated paper is intended as ink jet recording paper.

The non-coated paper used in the present invention is a paper sheet made from the slurry comprising wood pulp, a filler and various auxiliary agents by means of a known paper machine, such as a Fourdrinier paper machine and a twin wire paper machine. This sheet can be subjected to a calender treatment or/and a size press treatment, if needed. In addition, it may undergo glazing finish with a Yankee drum in the drying step.

The coated layer (a) provided on at least one side of the foregoing non-coated paper in the present invention is prepared by coating with a composition comprising a pigment and a binder and then drying it.

Such a composition can be coated with a coater properly selected from conventional ones, such as a blade coater, an air-knife coater, a roll coater, a comma coater, a brush coater, a squeegee coater, a curtain coater, a kiss coater, a bar coater and a gravure coater.

The drying of the coated layer can be performed using a drying system properly selected from known systems using, e.g., an air floating dryer, an infrared dryer and a cylinder dryer respectively.

The foregoing coating composition is generally prepared as an aqueous dispersion. Examples of a pigment usable in the coating composition include silica, alumina, calcium carbonate, magnesium carbonate, barium sulfate, aluminum hydroxide, kaolin, talc, clay, titanium dioxide, zinc oxide and various plastic pigments. These pigments may be used alone or in combination of two or more pigments properly selected therefrom.

In particular, silica and alumina are used to advantage due to their high porosity, compared with other pigments. More specifically, the high porosity enables the absorption of surplus ink which remains without accepted by the cast-coated layer (to produce an increase of Cobb water absorbency). In addition, those pigments are relatively transparent in the coated layer, so that they are tolerant to the poor coloration due to the penetration of ink thereinto.

In order to meet the requirement for Cobb water absorbency in the present invention, it is necessary to use silica and/or alumina in a proportion of at least 30 weight % to the total pigments. In particular, it is desirable that the proportion of those pigments be at least 50 weight %.

Examples of a binder usable therein include starch such as oxidized starch or esterified starch; cellulose derivatives such as carboxymethyl cellulose and hydroxyethyl cellulose; proteins such as casein, gelatin and soybean protein; and synthetic polymers, such as polyvinyl alcohol resin, polyvinyl pyrrolidone, acrylic resin, styrene-acrylic resin, vinyl acetate resin, vinyl chloride resin, urea resin, urethane resin, alkyd resin, polyester resin, polycarbonate resin, styrene-butadiene latex, and the derivatives of those resins. In the present invention, the resins as recited above can be used alone or in combination of two or more resins properly selected therefrom. When two or more resins are used, they can be mixed in various ratios depending on the properties and formula of the cast coating composition and the intended use of a cast-coated paper to be produced, so that the mixing ratio thereof has no particular limitation.

The pigment/binder ratio in the coated layer (a) (or the ratio of the dry weight of a pigment used to the dry weight of a binder mixed with the pigment, abbreviated as P/B ratio hereinafter) can be changed properly depending on the properties and formula of a cast-coated layer provided on the coated layer (a) and the intended use of the cast-coated paper produced. When the P/B ratio is great, the ink absorbency (Cobb water absorbency) tends to increase, but the smoothness tends to decrease. Conversely, when the P/B ratio is small, the smoothness tends to be elevated, but the ink absorbency (Cobb water absorbency) is apt to become insufficient. In the cast coating, the smoothness of the substrate has a great influence upon the smoothness of the cast-coated layer surface. Therefore, in order to meet the present requirements for the smoothness and Cobb water absorbency, it is desirable for the P/B ratio to be from 1.5 to 10.0.

To a coating composition for the coated layer (a) as mentioned above, known auxiliary agents, such as a pigment dispersing agent, a water retaining agent, a thickening agent, an anti-foaming agent, a preservative, a colorant, a waterproofing agent, a wetting agent, a plasticizer, a fluorescent dye, an ultraviolet absorbent, an antioxidant, and a cationic polyelectrolyte, can be added in proper amounts, if desired.

The dry coverage rate of the thus prepared coated composition in the present substrate for cast coating is not particularly limited so long as the Cobb water absorbency and the Oken smoothness of the substrate on the coated layer side are from 30 to 100 g/m$^2$ and at least 30 seconds respectively, and that the satisfactory productivity of the substrate for cast coating is secured.

Also, the coated layer (a) provided on non-coated paper in the aforementioned manner may be subjected to a surface treatment, such as supercalendering, if desired. However, the supercalendering treatment can heighten the smoothness of the coated layer surface, but it collapses the coated layer to lower the Cobb water absorbency. Further, a wetting agent may be applied to the coated layer (a) for the purpose of improving the wett-ability. In general, improving the wettability of the layer surface results in enhancing the Cobb water absorbency.

On the present substrate for cast coating, a cast-coated coated layer (b) is provided by coating on the substrate surface a cast coating composition generally prepared as an aqueous coating composition comprising a pigment, a binder and other auxiliary agents, pressing the coated layer against a heated cast drum while the coated layer is in a wet or plasticized state to copy the specular surface of the cast drum on the coated layer and, at the same time, dry the coated layer.

Examples of a pigment usable in the cast coating composition include silica, alumina, calcium carbonate, magnesium carbonate, barium sulfate, aluminum hydroxide, kaolin, talc, clay, titanium dioxide, zinc oxide and various plastic pigments. These pigments may be used alone or in combination of two or more pigments properly selected therefrom.

Examples of a binder usable in the cast coating composition include starch such as oxidized starch or esterified starch; cellulose derivatives such as carboxymethyl cellulose and hydroxyethyl cellulose; proteins such as casein, gelatin and soybean protein; and synthetic polymers, such as polyvinyl alcohol resin, polyvinyl pyrrolidone, acrylic resin, styrene-acrylic resin, vinyl acetate resin, vinyl chloride resin, urea resin, urethane resin, alkyd resin, polyester resin, polycarbonate resin, styrene-butadiene latex, and the derivatives of those resins. In the present invention, the resins as recited above can be used alone or in combination of two or more resins properly selected therefrom.

In the case where at least two kinds of pigments or at least two types of resins are used in combination, they can be mixed in various ratios depending on characteristics of a cast coating substrate used, properties and formula of the cast coating composition, the intended use of a cast-coated paper to be prepared and a coating method adopted, so that the mixing ratio has no particular limitation. Also, the P/B ratio in the cast coating composition is not particularly limited.

In addition to the aforementioned pigment and binder, the cast coating composition can contain known auxiliary agents, such as a pigment dispersing agent, a water retaining agent, a thickening agent, an anti-foaming agent, a preservative, a colorant, a waterproofing agent, a wetting agent, a plasticizer, a fluorescent dye, an ultraviolet absorbent, an antioxidant, a release agent, a pH modifier and a cationic polyelectrolyte, if needed.

In a case where the cast-coated layer (b) is provided using a re-wet process, the re-wetting solution used therein can contain, e.g., ammonium salts, polyamide resin, phosphorus compounds such as hexametaphosphoric acid, amide compounds, fluorinated compounds, zinc sulfate or/and calcium formate.

In another case where the cast-coated layer (b) is provided using a coagulation process, the coagulating solution used therein can contain as a coagulant, e.g., calcium, zinc, magnesium, sodium, potassium, lead, cadmium or ammonium salt of an acid, such as formic acid, acetic acid, citric acid, tartaric acid, lactic acid, hydrochloric acid, sulfuric acid or carbonic acid, or borax and various borates. In the present invention, the coagulants as recited above can be used alone or in combination of two or more salts selected properly therefrom.

Additionally, the term "silica" as used in the present invention is intended to include silica gel, white carbon and anhydrous silica as described in *Chemical Handbook,* Volume of Applied Chemistry, compiled by The Chemical Society of Japan, published by Maruzen Kabushiki Kaisha (Oct. 15, 1986).

The present substrate for cast coating can have a coated layer (a) on one side of non-coated paper as a base paper, or may have a coated layer (a) on both sides of non-coated paper to be used as a substrate for double cast coating.

In the process of producing the present substrate for cast coating, in-line production is included as a matter of course wherein the base paper making and the coating of a coated layer (a) are performed continuously in the same line. Also, it is possible to provide a coated layer (a) and a cast-coated layer (b) on a base paper for the cast coating substrate in the same production line.

The coated layer (a) provided in the preparation of a cast coating substrate according to the present invention is not necessarily a single layer, but it may have a multi-layer structure.

The substrate prepared for cast coating in accordance with the present invention is useful particularly for the production of cast-coated paper for ink jet recording because the cast-coated paper produced using the present substrate is heightened in productivity and suffers no deterioration in quality, compared with conventional cast-coated papers produced for ink jet recording.

Although, in recent situation, very expensive sol pigments have often been used in ink jet recording papers for the purpose of obtaining high definition images similar in quality level to silver halide photographs, when the present substrate is used and such a sol pigment is incorporated in a cast-coated layer (b) in accordance with the present invention, not only the productivity can be heightened but also the amount of sol pigment used can be reduced; as a result, high quality cast-coated paper for ink jet recording can be obtained at low production cost.

The present invention will now be illustrated in more detail by reference to the following examples, but these examples should not be construed as limiting on the scope of the invention in any way. Unless otherwise indicated, all percentages and all parts are by weight.

<Making of Base Paper>

Using as a raw material the slurry containing 80 parts of bleached craft pulp prepared by cooking hardwood and 20 parts of calcium carbonate (Escalon #800, trade name, produced by Sankyo Seifun Co., Ltd.), paper having a basis weight of 110 $g/m^2$ was made by means of a Fourdrinier paper machine. The thus made paper was employed as a base paper for preparing the present substrate for cast coating.

<Preparation of Substrate for Cast Coating>

To the base paper obtained above (non-coated paper), the coating compositions described below were each applied in various manners as described in Examples and Comparative Examples described hereinafter to prepare substrates for cast coating.

[Preparation of Coating Compositions]

Coating Composition A: A coating composition having a solids concentration of 25% was prepared using as a pigment 100 parts of amorphous silica, Finesil X-37 (trade name, a product of Tokuyama Corporation), and as a binder 20 parts of polyvinyl alcohol, PVA 105 (trade name, a product of Kuraray CO., LTD.).

Coating Composition B: A coating composition having a solids concentration of 25% was prepared using as a pigment 100 parts of amorphous silica, Finesil X-37 (trade name, a product of Tokuyama Corporation), and as a binder 10 parts of polyvinyl alcohol, PVA 105 (trade name, a product of Kuraray CO., LTD.).

Coating Composition C: A coating composition having a solids concentration of 25% was prepared using as a pigment 100 parts of amorphous silica, Finesil X-37 (trade name, a product of Tokuyama Corporation), and as a binder 65 parts of polyvinyl alcohol, PVA 105 (trade name, a product of Kuraray CO., LTD.).

Coating Composition D: A coating composition having a solids concentration of 25% was prepared using as pigments 50 parts of amorphous silica, Finesil X-37 (trade name, a product of Tokuyama Corporation), and 50 parts of calcium carbonate, Escalon #1500 (trade name, a product of Sankyo Seifun Co., Ltd.), and as a binder 20 parts of polyvinyl alcohol, PVA 105 (trade name, a product of Kuraray CO., LTD.).

Coating Composition E: A coating composition having a solids concentration of 25% was prepared using as pigments 30 parts of amorphous silica, Finesil X-37 (trade name, a product of Tokuyama Corporation), and 70 parts of calcium carbonate, Escalon #1500 (trade name, a product of Sankyo Seifun Co., Ltd.), and as a binder 20 parts of polyvinyl alcohol, PVA 105 (trade name, a product of Kuraray CO., LTD.).

Coating Composition F: A coating composition having a solids concentration of 25% was prepared using as a pigment 100 parts of amorphous silica, Finesil X-37 (trade name, a product of Tokuyama Corporation), and as a binder 100 parts of polyvinyl alcohol, PVA 105 (trade name, a product of Kuraray CO., LTD.).

Coating Composition G: A coating composition having a solids concentration of 25% was prepared using as a pigment 100 parts of amorphous silica, Finesil X-37 (trade name, a product of Tokuyama Corporation), and as a binder 7 parts of polyvinyl alcohol, PVA 105 (trade name, a product of Kuraray CO., LTD.). alcohol, PVA 105 (trade name, a product of Kuraray Co., Ltd.).

Coating Composition H: A coating composition having a solids concentration of 25% was prepared using as pigments 20 parts of amorphous silica, Finesil X-37 (trade name, a product of Tokuyama Corporation), and 80 parts of calcium carbonate, Escalon #1500 (trade name, a product of Sankyo Seifun Co., Ltd.), and as a binder 20 parts of polyvinyl alcohol, PVA 105 (trade name, a product of Kuraray CO., LTD.).

EXAMPLE 1

The Coating Composition A was coated on one side of the base paper so as to have a dry coverage rate of 15 g/m$^2$ by means of a blade coater, and then dried with an air floating dryer to prepare a substrate for cast coating.

EXAMPLE 2

The coated paper prepared in Example 1 was subjected to supercalendering treatment under the linear pressure of 150 kgf/cm to prepare a substrate for cast coating.

EXAMPLE 3

The coated paper prepared in Example 2 was further subjected to supercalendering treatment under the linear pressure of 150 kgf/cm to prepare a substrate for cast coating.

EXAMPLE 4

The Coating Composition B was coated on one side of the base paper so as to have a dry coverage rate of 15 g/m$^2$ by means of a blade coater, then dried with an air floating dryer, and further subjected to supercalendering treatment under the linear pressure of 150 kgf/cm to prepare a substrate for cast coating.

EXAMPLE 5

The coated paper prepared in Example 4 was further subjected to supercalendering treatment under the linear pressure of 150 kgf/cm to prepare a substrate for cast coating.

EXAMPLE 6

The Coating Composition C was coated on one side of the base paper so as to have a dry coverage rate of 15 g/m$^2$ by means of a blade coater, and then dried with an air floating dryer to prepare a substrate for cast coating.

EXAMPLE 7

The Coating Composition D was coated on one side of the base paper so as to have a dry coverage rate of 15 g/m$^2$ by means of a blade coater, and then dried with an air floating dryer to prepare a substrate for cast coating.

EXAMPLE 8

The coated paper prepared in Example 7 was subjected to supercalendering treatment under the linear pressure of 150 kgf/cm to prepare a substrate for cast coating.

EXAMPLE 9

The Coating Composition E was coated on one side of the base paper so as to have a dry coverage rate of 15 g/m$^2$ by means of a blade coater, and then dried with an air floating dryer to prepare a substrate for cast coating.

Comparative Example 1

The Coating Composition B was coated on one side of the base paper so as to have a dry coverage rate of 15 g/m2 by means of a blade coater, and then dried with an air floating dryer to prepare a substrate for cast coating.

Comparative Example 2

The coated paper prepared in Example 6 was subjected to supercalendering treatment under the linear pressure of 150 kgf/cm to prepare a substrate for cast coating.

Comparative Example 3

The coated paper prepared in Example 8 was further subjected to supercalendering treatment under the linear pressure of 150 kgf/cm to prepare a substrate for cast coating.

Comparative Example 4

The Coating Composition F was coated on one side of the base paper so as to have a dry coverage rate of 15 g/m$^2$ by means of a blade coater, and then dried with an air floating dryer to prepare a substrate for cast coating.

Comparative Example 5

The Coating Composition G was coated on one side of the base paper so as to have a dry coverage rate of 15 g/m$^2$ by means of a blade coater, and then dried with an air floating dryer to prepare a substrate for cast coating.

Comparative Example 6

The coated paper prepared in Comparative Example 5 underwent supercalendering treatment under the linear pressure of 150 kgf/cm twice, thereby preparing a substrate for cast coating.

Comparative Example 7

The Coating Composition H was coated on one side of the base paper so as to have a dry coverage rate of 15 g/m$^2$ by means of a blade coater, and then dried with an air floating dryer to prepare a substrate for cast coating.

The substrates prepared in Examples 1–9 and Comparative Examples 1–7 were each examined for Cobb water absorbency and Oken smoothness according to the testing methods defined in JIS P8140 and JAPAN TAPPI No.5 respectively. The results obtained are shown in Table 1.

TABLE 1

| | Coating composition | Silica content in pigment (wt %) | P/B ratio | Super-calendering | Cobb water absorbency (g/m$^2$) | Oken smoothness (sec) |
|---|---|---|---|---|---|---|
| Example 1 | A | 100 | 5.0 | — | 80 | 46 |
| Example 2 | A | 100 | 5.0 | once | 69 | 69 |
| Example 3 | A | 100 | 5.0 | twice | 59 | 91 |
| Example 4 | B | 100 | 10.0 | once | 96 | 50 |
| Example 5 | B | 100 | 10.0 | twice | 79 | 62 |
| Example 6 | C | 100 | 1.5 | — | 34 | 73 |
| Example 7 | D | 50 | 5.0 | — | 46 | 82 |
| Example 8 | D | 50 | 5.0 | once | 37 | 106 |
| Example 9 | E | 30 | 5.0 | — | 32 | 60 |
| Comparative Example 1 | B | 100 | 10.0 | — | 111 | 32 |
| Comparative Example 2 | C | 100 | 1.5 | once | 25 | 98 |
| Comparative Example 3 | D | 50 | 5.0 | twice | 27 | 122 |
| Comparative Example 4 | F | 100 | 1.0 | — | 22 | 90 |
| Comparative Example 5 | G | 100 | 15.0 | — | 126 | 9 |
| Comparative Example 6 | G | 100 | 15.0 | twice | 119 | 36 |
| Comparative Example 7 | H | 20 | 5.0 | — | 26 | 53 |

<Production of Cast-coated Paper>

In the manners mentioned below, a cast-coated layer (b) was provided on each of the substrates prepared in the foregoing Examples and Comparative Examples, thereby producing ten samples of cast-coated paper.

[Preparation of Cast Coating Composition]

Cast Coating Composition A: A cast coating composition having a solids concentration of 30% was prepared using as a pigment 100 parts of amorphous silica, Finesil X-37 (trade name, a product of Tokuyama Corporation), as binders 10 parts of styrene-butadiene latex, JSR-0617 (trade name, a product of JSR Corporation.) and 30 parts of casein (a product of New Zealand), and as a release agent 5 parts of calcium stearate, Nopcoat SYC (trade name, a product of SAN-NOPCO Limited).

Cast Coating Composition B: A cast coating composition having a solids concentration of 20% was prepared using as a pigment 100 parts of alumina sol, Cataloid AS-1 (trade name, a product of Catalysis & Chemical Ind. CO., LTD.), as binders 10 parts of styrene-butadiene latex, JSR-0617 (trade name, produced by JSR Corporation.) and 30 parts of casein (a product of New Zealand), and as a release agent 5 parts of calcium stearate, Nopcoat SYC (trade name, produced by SAN-NOPCO Limited).

[Preparation of Re-wetting Solution]

A re-wetting solution containing zinc sulfate in a concentration of 0.3% was prepared.

[Preparation of Coagulating Solution]

A coagulating solution containing calcium formate in a concentration of 5% was prepared.

EXAMPLE 10

Cast-coated papers differing in dry coverage rate were produced as follows: The cast coating Composition A was coated on the substrate prepared in Example 1 by means of a comma coater in a properly varied amount, pressed against a cast drum heated to 100° C. while the coating composition on the substrate was in a wet condition, and thereby dried.

EXAMPLE 11

Cast-coated papers differing in dry coverage rate were produced as follows: The cast coating Composition A was coated on the substrate prepared in Example 1 by means of a comma coater in a properly varied amount, and dried with an air floating dryer. Further, the dried coating composition was treated with the re-wetting solution, pressed to a cast drum heated to 100° C., and thereby dried again.

EXAMPLE 12

Cast-coated papers differing in dry coverage rate were produced as follows: The cast coating Composition A was coated on the substrate prepared in Example 1 by means of a comma coater in a properly varied amount, treated with the coagulating solution while the composition on the substrate was in a wet condition, pressed to a cast drum heated to 100° C., and thereby dried.

EXAMPLE 13

Cast-coated papers differing in dry coverage rate were produced as follows: The cast coating Composition B was coated on the substrate prepared in Example 1 by means of a comma coater in a properly varied amount, pressed against a cast drum heated to 100° C. while the coating composition on the substrate was in a wet condition, and thereby dried.

EXAMPLE 14

Cast-coated papers differing in dry coverage rate were produced as follows: The cast coating Composition A was coated on the substrate prepared in Example 4 by means of a comma coater in a properly varied amount, pressed against a cast drum heated to 100° C. while the coating composition on the substrate was in a wet condition, and thereby dried.

EXAMPLE 15

Cast-coated papers differing in dry coverage rate were produced as follows: The cast coating Composition A was coated on the substrate prepared in Example 9 by means of a comma coater in a properly varied amount, pressed against a cast drum heated to 100° C. while the coating composition on the substrate was in a wet condition, and thereby dried.

Comparative Example 8

Cast-coated papers differing in dry coverage rate. were produced as follows: The cast coating Composition A was coated on the substrate prepared in comparative Example 1 by means of a comma coater in a properly varied amount, pressed against a cast drum heated to 100° C. while the coating composition on the substrate was in a wet condition, and thereby dried.

Comparative Example 9

Cast-coated papers differing in dry coverage rate were produced as follows: The cast coating Composition A was coated on the substrate prepared in Comparative Example 4 by means of a comma coater in a properly varied amount, pressed against a cast drum heated to 100° C. while the coating composition on the substrate was in a wet condition, and thereby dried.

Comparative Example 10

Cast-coated papers differing in dry coverage rate were produced as follows: The cast coating Composition A was coated on the substrate prepared in Comparative Example 5 by means of a comma coater in a properly varied amount, pressed against a cast drum heated to 100° C. while the coating composition on the substrate was in a wet condition, and thereby dried.

Comparative Example 11

Cast-coated papers differing in dry coverage rate were produced as follows: The cast coating Composition A was coated on the substrate prepared in Comparative Example 7 by means of a comma coater in a properly varied amount, pressed against a cast drum heated to 100° C. while the coating composition on the substrate was in a wet condition, and thereby dried.

The cast-coated papers produced in the aforementioned Examples and Comparative Examples were each examined for productivity in conformity to the following evaluation standard. The evaluation results thus obtained are shown in Table 2.

Additionally, in each of the aforementioned Examples and Comparative Examples, the amount of cast coating Composition coated was varied so that the minimum and maximum of dry coverage rates of the cast-coatd papers produced was about 5 g/m$^2$ and about 50 g/m$^2$ respectively, and the dry coverage rate was increased by about 1 g/m$^2$ every production of a cast-coated paper.

[Production of Cast-coated Paper as Standard]

In the case of using the cast coating composition A, standard cast-coated papers were produced in three types of cast coating processes respectively; while in the case of using the cast coating composition B, a standard cast-coated paper was produced in direct cast coating process. Therein, the same non-coated paper as used for preparing the substrates in the foregoing Examples 1–9 and Comparative Examples 1–7, except that the basis weight thereof was changed to 125 g/m$^2$, was used as the substrate for cast coating and each cast-coated layer provided thereon had a dry coverage rate of 20 g/m$^2$.

On each of the cast-coated papers produced as standard and those produced in Examples 10–15 and Comparative Examples 8–11, black solid images were recorded under the resolution of 720 dpi by means of an ink jet printer, PM-700C (trade name, made by Seiko Epson Co.). For each of the foregoing Examples and Comparative Examples, the cast-coated papers thus recorded were examined as to the dry coverage rate corresponding to the condition that the ink absorbency and the general quality, including glossiness and surface strength, were both on a level with those of the standard cast-coated paper (which is referred to as “required dry coverage rate” and represented by X). Then, the relative value R defined by the following equation (1) was determined for each Example and each Comparative Example:

$$R=X/20 \quad (1)$$

Additionally, the ink absorbency was evaluated by visual observation respecting the presence of feathering on the borders of recorded and non-recorded areas; while the glossiness was evaluated in conformity to JIS P-7142 and the surface strength was evaluated according to the wax-utilized method described in JIS P-8129.

According to the evaluation method adopted herein, the smaller the value of R in equation (1), the lower the dry coverage rate required for achieving the same properties as the cast-coated paper using a conventional substrate. The lowering of a dry coverage rate makes it possible to increase the operation speed of a coater; as a result, the productivity can be heightened.

In accordance with the present invention, the R values obtained were all below 0.7, so that it is safely said that the use of the present substrates produced significant improvement in the productivity of cast-coated paper.

TABLE 2

| | Substrate | | | |
|---|---|---|---|---|
| | Cobb water absorbency (g/m$^2$) | Oken smoothness (sec) | Cast coating method | Productivity (R value) |
| Example 10 | 80 | 46 | direct process | 0.53 |
| Example 11 | 80 | 46 | re-wet process | 0.62 |
| Example 12 | 80 | 46 | coagulation process | 0.52 |
| Example 13 | 80 | 46 | direct process | 0.50 |
| Example 14 | 96 | 50 | direct process | 0.64 |
| Example 15 | 32 | 60 | direct process | 0.66 |
| Comparative Example 8 | 111 | 32 | direct process | 0.98 |
| Comparative Example 9 | 22 | 90 | direct process | 0.95 |

TABLE 2-continued

| | Substrate | | | |
|---|---|---|---|---|
| | Cobb water absorbency ($g/m^2$) | Oken smoothness (sec) | Cast coating method | Productivity (R value) |
| Comparative Example 10 | 126 | 9 | direct process | 1.05 |
| Comparative Example 11 | 26 | 53 | direct process | 0.75 |

What is claimed is:

1. A cast-coated paper for ink jet recording having a cast-coated layer on a substrate: said substrate comprising non-coated paper and at least one coating layer (a) thereon containing at least a pigment and a binder, and wherein the side of the coating layer (a) has water absorbency of from 30 to 100 $g/m^2$, determined using the Cobb testing method described in JIS P8140 under a condition that the water absorption time is 60 seconds, and smoothness from 30 to 106 seconds, measured with an Oken type smoothness tester following the operational procedure described in JAPAN TAPPI No. 5; and said cast-coated layer being a coating layer (b) provided on the coating layer (a) using an aqueous coating composition containing at least a pigment and a binder in accordance with a cast coating method.

2. A cast-coated paper according to claim 1, wherein at least 30 weight % of the pigment contained in the coating layer (a) is silica, alumina or a mixture thereof.

3. A cast-coated paper according to claim 1, wherein the ratio of the pigment to the binder in the coating layer (a) is from 1.5 to 10.0 on a dry weight basis.

4. A cast-coated paper according to claim 1, wherein the substrate has a water absorbency of 40 to 80 $g/m^2$.

5. A cast-coated paper according to claim 1, wherein the smoothness of the side of the substrate where the at least one coating layer is provided is from 50 to 106 seconds.

6. A cast-coated paper according to claim 1, wherein the non-coated paper comprises wood pulp and at least one filler.

7. A cast-coated paper according to claim 1, having at least one coating layer (a) and a cast-coated layer (b) on each side of the non-coated paper.

8. A cast-coated paper according to claim 1, wherein the cast-coated layer (b) contains a sol pigment.

9. The cast-coated paper of claim 1, wherein the paper is capable of ink jet recording.

10. A cast-coated paper according to claim 1, wherein at least 30 weight % of the pigment contained in the coating layer (a) is silica.

11. A cast-coated paper according to claim 10, wherein the binder contained in the coating layer (b) comprises casein.

* * * * *